(12) United States Patent
Moriwaki

(10) Patent No.: US 7,907,681 B2
(45) Date of Patent: Mar. 15, 2011

(54) CIRCUIT AND METHOD FOR DIFFERENTIAL SIGNALING RECEIVER

(75) Inventor: Isamu Moriwaki, Toyonaka (JP)

(73) Assignee: Ricoh Company, Ltd., Tokyo (JP)

( * ) Notice: Subject to any disclaimer, the term of this patent is extended or adjusted under 35 U.S.C. 154(b) by 601 days.

(21) Appl. No.: 12/007,236

(22) Filed: Jan. 8, 2008

(65) Prior Publication Data

US 2008/0165902 A1 Jul. 10, 2008

(30) Foreign Application Priority Data

Jan. 10, 2007 (JP) .................... 2007-002271

(51) Int. Cl.
 *H04L 27/00* (2006.01)
(52) U.S. Cl. ........................................ 375/316
(58) Field of Classification Search ............ 375/52, 375/89, 96, 127, 246, 266, 274, 280, 287, 375/359, 244, 316, 318, 330, 340; 330/252; 455/212, 218, 701
See application file for complete search history.

(56) References Cited

U.S. PATENT DOCUMENTS

| | | | | |
|---|---|---|---|---|
| 6,137,306 A | * | 10/2000 | Hirata et al. | ............ 326/26 |
| 2003/0158991 A1 | * | 8/2003 | Deyring et al. | ............ 710/305 |
| 2005/0169356 A1 | * | 8/2005 | Matsumoto et al. | ............ 375/220 |
| 2006/0077916 A1 | * | 4/2006 | Oshita et al. | ............ 370/299 |
| 2007/0030035 A1 | * | 2/2007 | Komatsu et al. | ............ 327/65 |

FOREIGN PATENT DOCUMENTS

| | | |
|---|---|---|
| JP | 2005-86646 | 3/2005 |
| JP | 2005-260889 | 9/2005 |
| JP | 2006-165992 | 6/2006 |

* cited by examiner

*Primary Examiner* — Sam K Ahn

(74) *Attorney, Agent, or Firm* — Dickstein Shapiro LLP

(57) ABSTRACT

A receiver for a differential signal transmitted over a serial interface includes a squelch detector, a differential amplifier, a start pattern detector, an end pattern detector, and a controller. The squelch detector is configured to output a squelch signal when determining that the differential signal is present on the serial interface. The differential amplifier is configured to extract binary data from the differential signal. The start pattern detector is configured to indicate a first state when detecting a given start pattern in the binary data. The end pattern detector is configured to indicate a second state when detecting a given end pattern in the binary data. The controller is configured to activate the start pattern detector in response to the squelch signal. The controller is configured to validate the differential signal in the first state. The controller is configured to end receiving the differential signal in the second state.

18 Claims, 10 Drawing Sheets

FIG. 10A

| SYNC | PID | ~PID | ADDR | ENDP | CRC5 | EOP |
|---|---|---|---|---|---|---|
| | 4 | 4 | 7 | 4 | 5 | |

FIG. 10B

| SYNC | PID | ~PID | FRAME NUMBER | CRC5 | EOP |
|---|---|---|---|---|---|
| | 4 | 4 | 11 | 5 | |

FIG. 10C

| SYNC | PID | ~PID | DATA | CRC16 | EOP |
|---|---|---|---|---|---|
| | 4 | 4 | | 5 | |

FIG. 10D

| SYNC | PID | ~PID | EOP |
|---|---|---|---|
| | 4 | 4 | |

CIRCUIT AND METHOD FOR DIFFERENTIAL SIGNALING RECEIVER

CROSS-REFERENCE TO RELATED APPLICATIONS

This application claims priority from Japanese Patent Application No. 2007-002271, filed on Jan. 10, 2007 in the Japanese Patent Office, the entire contents of which are incorporated by reference herein.

FIELD OF THE INVENTION

The present invention relates to a circuit and method for differential signaling receiver, and more particularly, to a receiver circuit and a method used to receive a differential signal transmitted over a serial interface.

DISCUSSION OF THE BACKGROUND

Differential signaling is a data transfer technique widely used in digital and analog data interfaces due to its high noise immunity during data transmission. An example using a differential signaling interface is universal serial bus (USB), which is used to interconnect digital devices such as personal computers, printers, and scanners, as well as digital recording devices including digital versatile discs (DVDs) and digital video cameras. Currently, USB interfaces are increasingly used for common, hand-held digital devices such as mobile phones and portable media players.

In a differential signaling system, a differential transmitter transmits a differential signal to a differential receiver over a communication link, which is physically a pair of wires carrying complementary input voltages Vin+ and Vin−. Upon receiving the differential signal, the receiver compares Vin+ and Vin− to output a "0" or "1" depending on whether or not the two voltages differ in amplitude, thus extracting intended data from the incoming differential signal.

Typically, such a differential signaling system incorporates a squelch detector to detect a state of communication link at the receiver end. A squelch detector detects a difference between Vin+ and Vin− to output a squelch signal, indicating a squelch state when the voltage difference does not exceed a given threshold, and an unsquelch state when the voltage difference does exceed the given threshold. For example, when the threshold value is set at 100 mV, as is defined by USB specifications, a squelch detector detects a squelch state for a difference of 50 mV and an unsquelch state for a difference of 150 mV. Such a squelch signal is used to determine whether the differential signal, which may normally exhibit a given level of voltage difference, is present or not on the communication link. Thus, the receiver invalidates the differential signal when the communication link is in a squelch state.

Currently, some differential signaling systems use low voltage and reduced differential swings to achieve high data transfer rates. For example, a serial data interface implementing USB 2.0 can operate at a transfer rate of up to 480 Mbps in high-speed mode. Such high-speed differential signaling, where it becomes difficult to distinguish signal components from noise, requires a stable and secure system to ensure reliable data transmission, such as a receiver with a high gain amplifier and a squelch detector with increased stability.

Various schemes have been proposed for enhancing data transmission reliability. For example, one conventional method for stable squelch detection uses a reduced number of amplifiers in the detector circuit. Such a circuit design may provide stability in squelch detection without increasing power consumption and manufacturing cost, but involves a complicated structure which may sacrifice efficiency in the circuit.

Another conventional method introduces a squelch detector with a control circuit that controls a squelch signal to stably provide squelch detection. However, this conventional method may be impractical when used with a serial data interface such as USB 2.0 interfaces.

Both of these conventional approaches are made to enhance performance of a squelch detector, which may have limited effectiveness in providing reliable data transmission. Thus, there is still a need for a useful, non-complicated system for reliable data transmission that can meet requirements of high-speed differential signaling.

SUMMARY OF THE INVENTION

This patent specification describes a novel receiver for a differential signal transmitted over a serial interface.

In one embodiment, the novel receiver includes a squelch detector, a differential amplifier, a start pattern detector, an end pattern detector, and a controller. The squelch detector is configured to output a squelch signal when determining that the differential signal is present on the serial interface. The differential amplifier is configured to extract binary data from the differential signal. The start pattern detector is configured to indicate a first state when detecting a given start pattern in the binary data. The end pattern detector is configured to indicate a second state when detecting a given end pattern in the binary data. The controller is configured to activate the start pattern detector in response to the squelch signal. The controller is configured to validate the differential signal in the first state. The controller is configured to end receiving the differential signal in the second state.

This patent specification also describes a novel method for receiving a differential signal transmitted over a serial interface.

In one embodiment, the novel method includes steps of output, extraction, start pattern detection, validation, end pattern detection, and ending. The output step outputs a squelch signal when determining that the differential signal is present on the serial interface. The extraction step extracts binary data from the differential signal. The start pattern detection step detects a given start pattern in the binary data in response to the squelch signal. The validation step validates the differential signal upon detection of the given start pattern. The end pattern detection step detects a given end pattern in the binary data. The ending step ends receiving the differential signal upon detection of a given end pattern.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 10A through 10D illustrate examples of formats for different types of Universal Serial Bus packets.

DETAILED DESCRIPTION OF PREFERRED EMBODIMENTS

Figure 1:
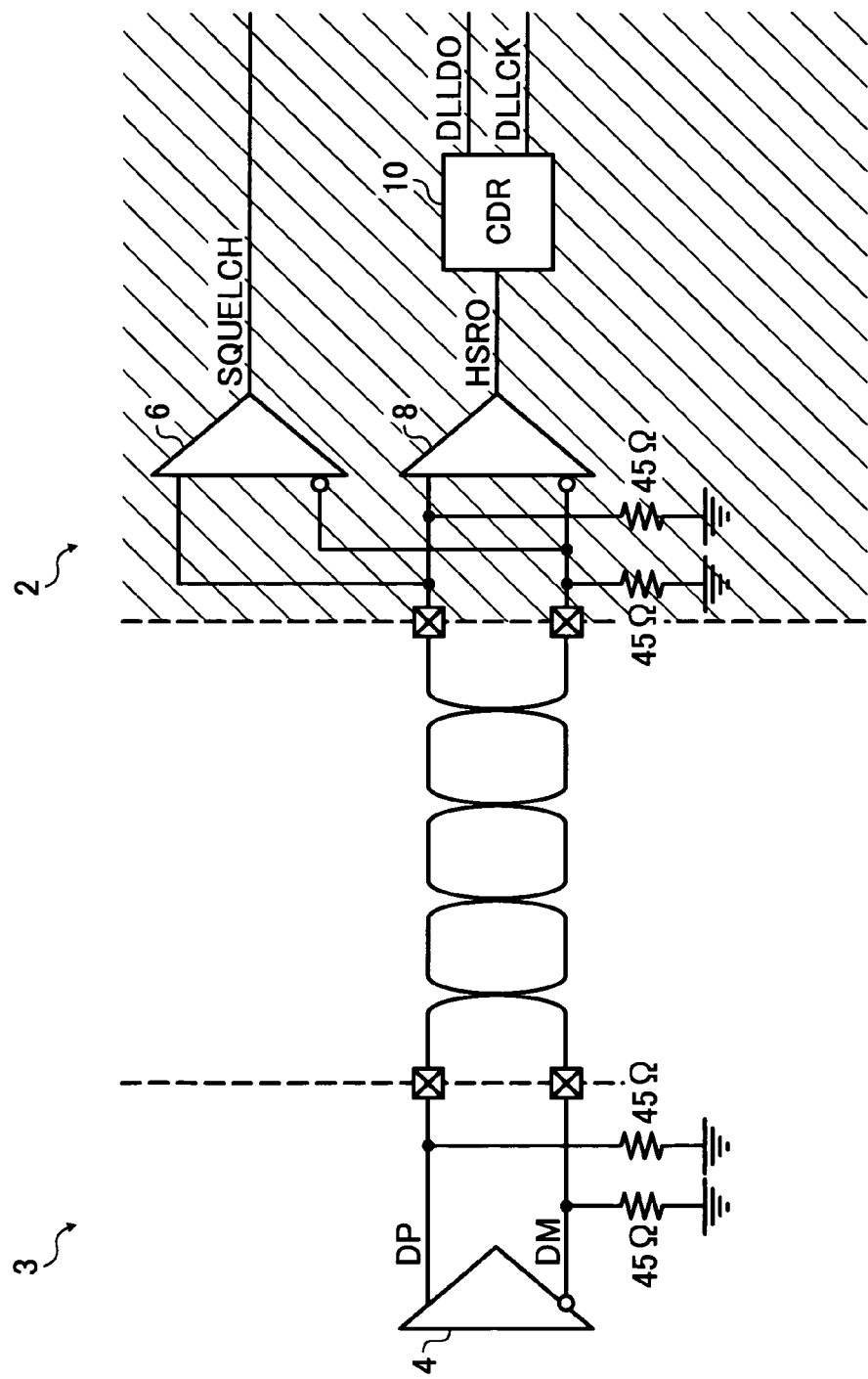
FIG. 1 is a circuit diagram illustrating an analog front end of a differential receiver circuit according to at least one example embodiment of this patent specification.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner.

Referring now to the drawings, wherein like reference numerals designate identical or corresponding parts throughout the several views, example embodiments of the present patent application are described.

Referring to FIG. 1 of the drawings, a circuit diagram illustrating an analog front end (AFE) 2 of a differential receiver circuit 12 (see FIG. 3) according to at least one example embodiment of this patent specification is described.

In FIG. 1, the AFE 2 includes a squelch detector 6, a differential comparator 8, and a clock data recovery (CDR) circuit 10. The AFE 2 is linked to a differential transmitter 3 via a pair of data lines. The differential transmitter 3 includes a differential generator 4.

In the differential transmitter 3, the differential generator 4 generates a differential signal pair DP and DM containing serial data formatted according to given serial data interface standards. The differential signal pair DP and DM travels to the AFE 2 over the data line pair, which may have a voltage difference of 400 mV, for example, when transmitting data.

In the AFE 2, the differential signal pair DP and DM are input to each of the squelch detector 6 and the differential comparator 8.

The squelch detector 6 compares the differential signal pair DP and DM to output a detection signal SQUELCH according to a voltage difference therebetween. The SQUELCH signal goes high to indicate a squelch state when the voltage difference does not exceed a given threshold, and goes low to indicate an unsquelch state when the voltage difference exceeds the given threshold.

The differential comparator 8 outputs a binary data signal HSRO to the CDR circuit 10, indicating either "0" or "1" depending on whether the difference between DP and DM is negative or positive. The CDR circuit 10 generates and/or recovers a data signal DLLDO and a clock signal DLLCK from the incoming data signal HSRO.

The signals SQUELCH, DLLDO, and DLLCK output from the AFE 2 are input to the differential receiver circuit 12 connected thereto.

Figure 2:
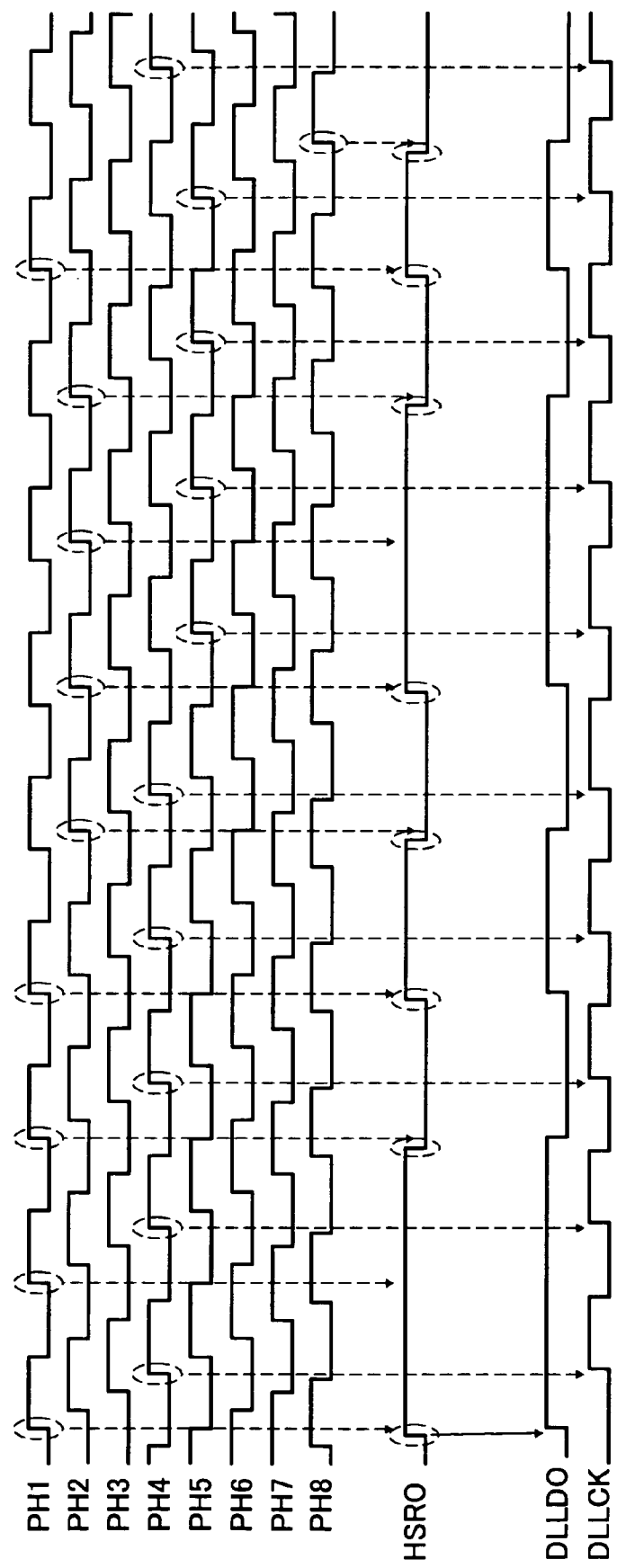
FIG. 2 is a timing diagram illustrating operation of a clock data recovery circuit of the analog front end of FIG. 1.

Referring to FIG. 2, a timing diagram illustrating operation of the CDR circuit 10 is described.

As shown in FIG. 2, the CDR circuit 10 provides eight clocks of a same frequency PH1 through PH8 with a constant phase shift therebetween. The CDR circuit 10 detects a transition edge of the HSRO signal, and determines one clock among PH1 through PH8 having a rising edge corresponding to the transition edge. The CDR circuit 10 selects one clock following the determined clock with a delay of, for example, three phases, and generates the DLLCK signal based on the selected clock. The DLLCK signal remains synchronous with the selected clock before detection of another transition edge of the HSRO signal.

Figure 3:
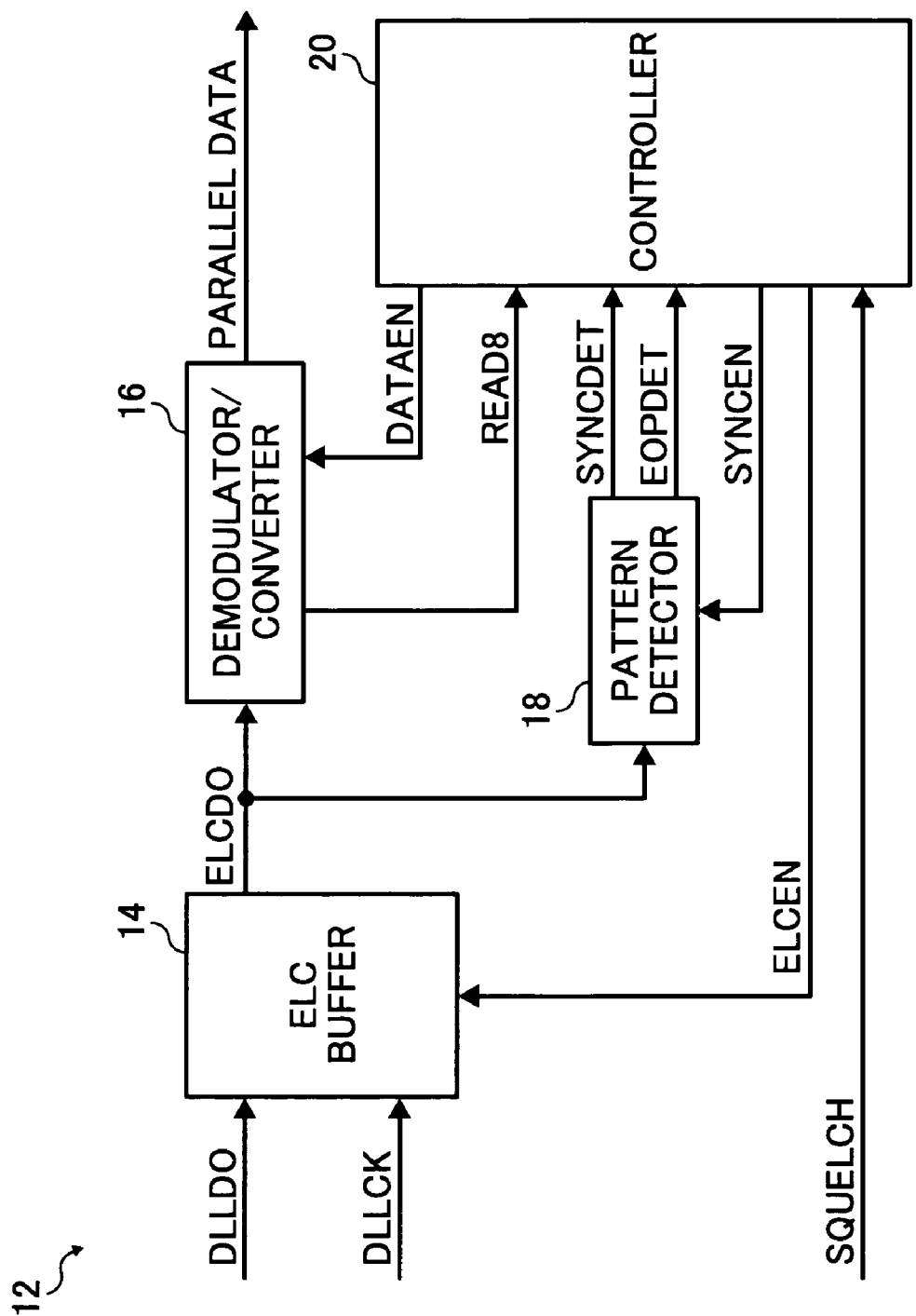
FIG. 3 is a block diagram illustrating an embodiment of the differential receiver circuit.

Referring to FIG. 3, a block diagram illustrating an embodiment of the differential receiver circuit 12.

In FIG. 3, the differential receiver circuit 12 includes an elastic (ELC) buffer 14, a demodulator/converter 16, a pattern detector 18, and a controller 20. The differential receiver circuit 12 further includes a clock generator, not shown, that supplies a system clock CK480M to circuit components connected thereto. The differential receiver circuit 12 may be constructed on a semiconductor integrated circuit (IC).

In the differential receiver circuit 12, the controller 20 receives the SQUELCH signal from the AFE 2. In response to the SQUELCH signal going low, the controller 20 outputs enable signals ELCEN, SYNCEN, and DATAEN going high to enable the ELC buffer 14, the demodulator/converter 16, and the pattern detector 18, respectively. The controller 20 receives an indication signal READ8 from the demodulator/converter 16, and detection signals SYNCDET and EOPDET from the pattern detector 18.

The ELC buffer 14 receives the DLLDO and DLLCK signals from the AFE 2. When enabled by the ELCEN signal, the ELC buffer 14 resynchronizes the data signal DLLDO with the system clock CK480M by absorbing phase differences between the clock signals DLLCK and CK480M. The ELC buffer 14 outputs a resynchronized data signal ELCDO to each of the demodulator/converter 16 and the pattern detector 18.

The demodulator/converter 16 outputs parallel data PARALLEL DATA by demodulating the incoming ELCDO signal, when enabled by the DATAEN signal. The demodulator/converter 16 outputs the READ8 signal going high to indicate that a given amount of data is received from the ELC buffer 14.

The pattern detector 18 detects a given start pattern and a given end pattern appearing in the incoming ELCDO signal, when enabled by the SYNCEN signal. The pattern detector 18 outputs the SYNCDET signal going high to indicate detection of the given start pattern. The pattern detector 18 also outputs the EOPDET signal going high to indicate detection of the given end pattern.

Further, the controller 20 receives an error signal ERR, not shown, which goes high to deactivate the controller 20 when the ELC buffer 14 becomes either empty or full, and/or when the demodulator/converter 16 detects an error in the incoming ELCDO signal.

Preferably, parameters used in the differential receiver circuit 12, such as the amount of data to be detected by the demodulator/converter 16, and the start and end patterns to be detected by the pattern detector 18, may be externally specified according to configurations of the differential receiver circuit 12.

Figure 4:
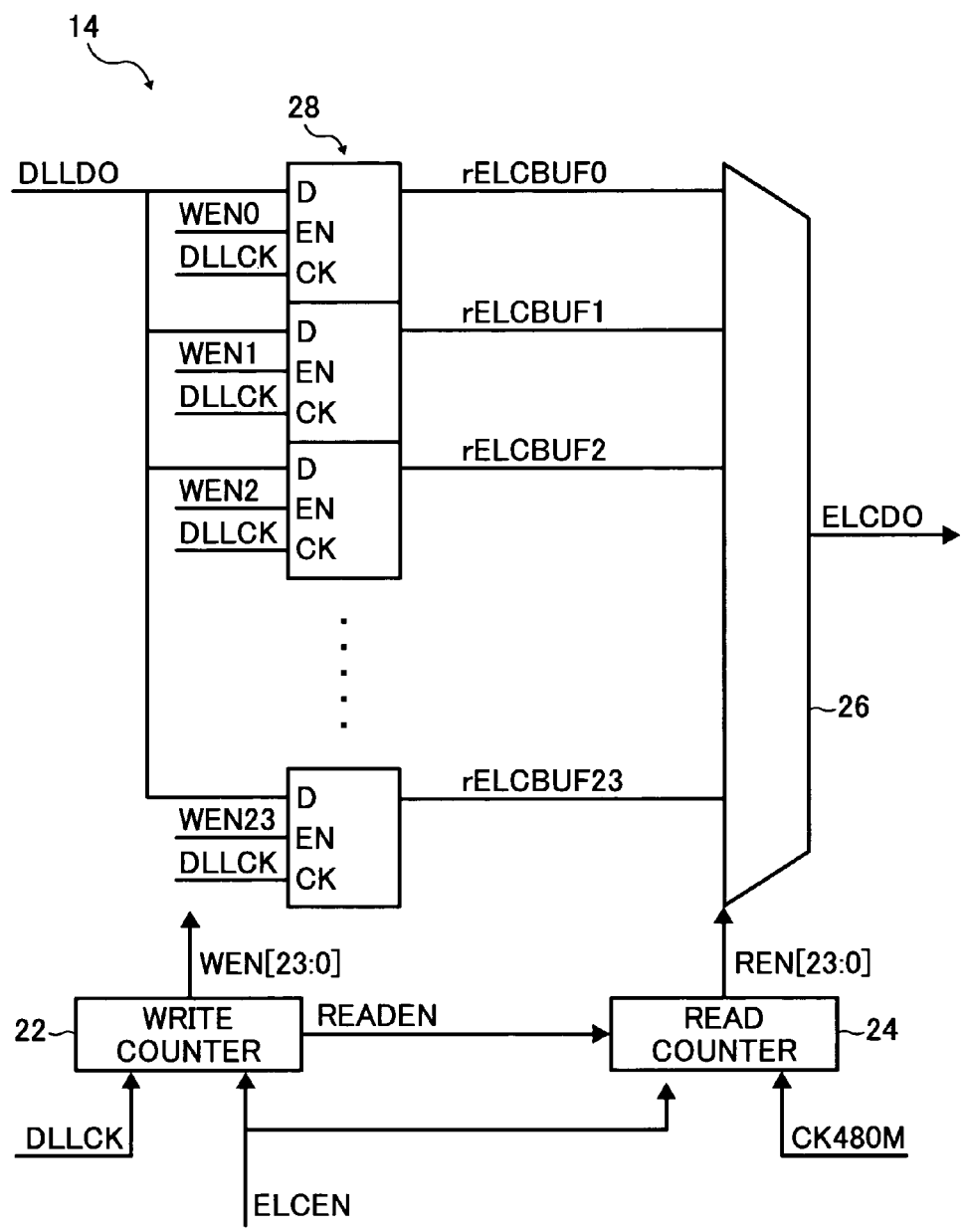
FIG. 4 is a circuit diagram illustrating an example of an elastic buffer of the differential receiver circuit of FIG. 3.

Referring to FIG. 4, a circuit diagram illustrating an example of the ELC buffer 14 is described.

In FIG. 4, the ELC buffer 14 includes a write counter 22, a read counter 24, flip-flops with clock enable 28, and a selector 26.

In the ELC buffer 14, the write counter 22 receives the recovered clock DLLCK from the AFE 2 while the read counter 24 receives the system clock CLK480M. Each of the flip-flops 28 receives the DLLDO signal at a data input and the DLLCK signal at a clock input. The ELCEN signal is input to activate the write counter 22 and the read counter 24.

When activated, the write counter 22 sequentially outputs enable signals WEN0 through WEN23 to the flip-flops 28. The write counter 22 also outputs an enable signal READEN to the read counter 24. Upon receiving the READEN signal, the read counter 24 sequentially outputs enable signals REN0 through REN23 to the selector 26.

In response to the signals WEN0 through WEN23, the flip-flops 28 output latched values rELCBUF0 through rEL-CBUF23 to the selector 26. In response to REN0 through REN23, the selector 26 sequentially outputs the received values rELCBUF0 through rELCBUF23, generating the ELCDO signal synchronized to the system clock CK480M.

Figure 5:
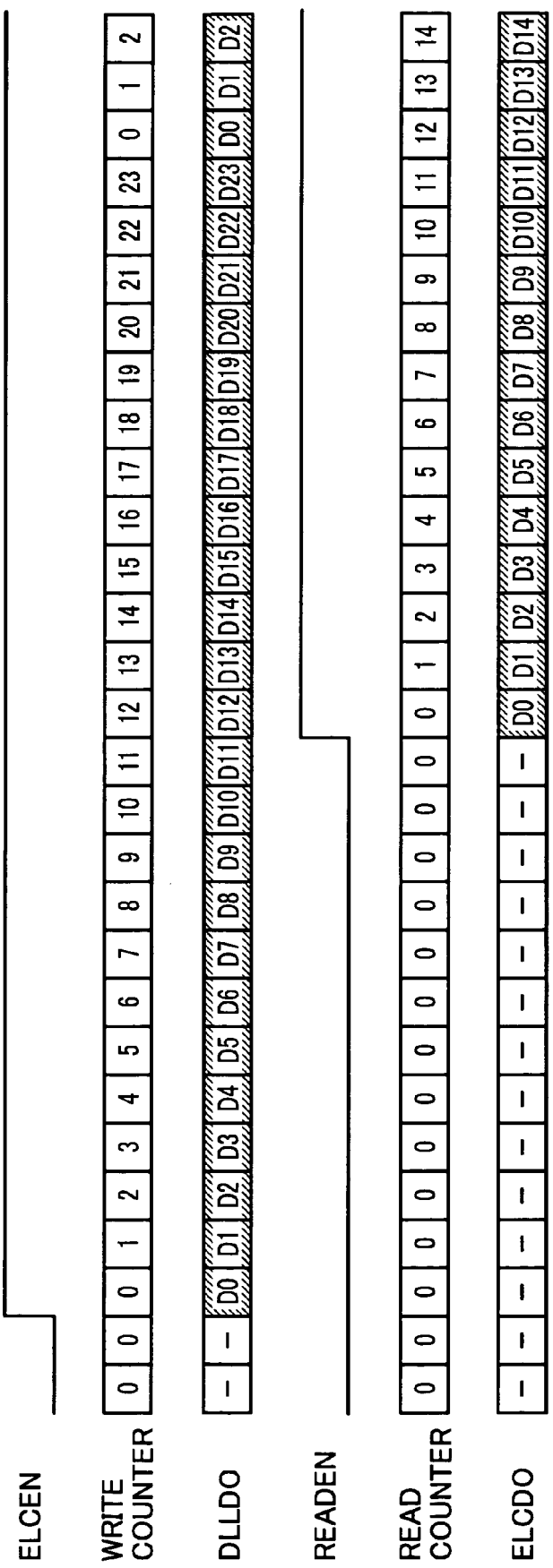
FIG. 5 is a timing diagram illustrating operation of the elastic buffer of FIG. 4.

Referring to FIG. 5, a timing diagram illustrating the operation of the ELC buffer 14 is described.

When the ELCEN signal goes high, the data signal DLLDO is read in multiple bits D0 through D23, which are synchronized to the write counter 22 incrementing from 0 to 23 per each write cycle. During the write cycle, the READEN signal goes high so that the buffered data signal ELCDO is output in the multiple bits D0 through D23, which are synchronized to the read counter 24 incrementing from 0 to 23 per each read cycle.

Figure 6:
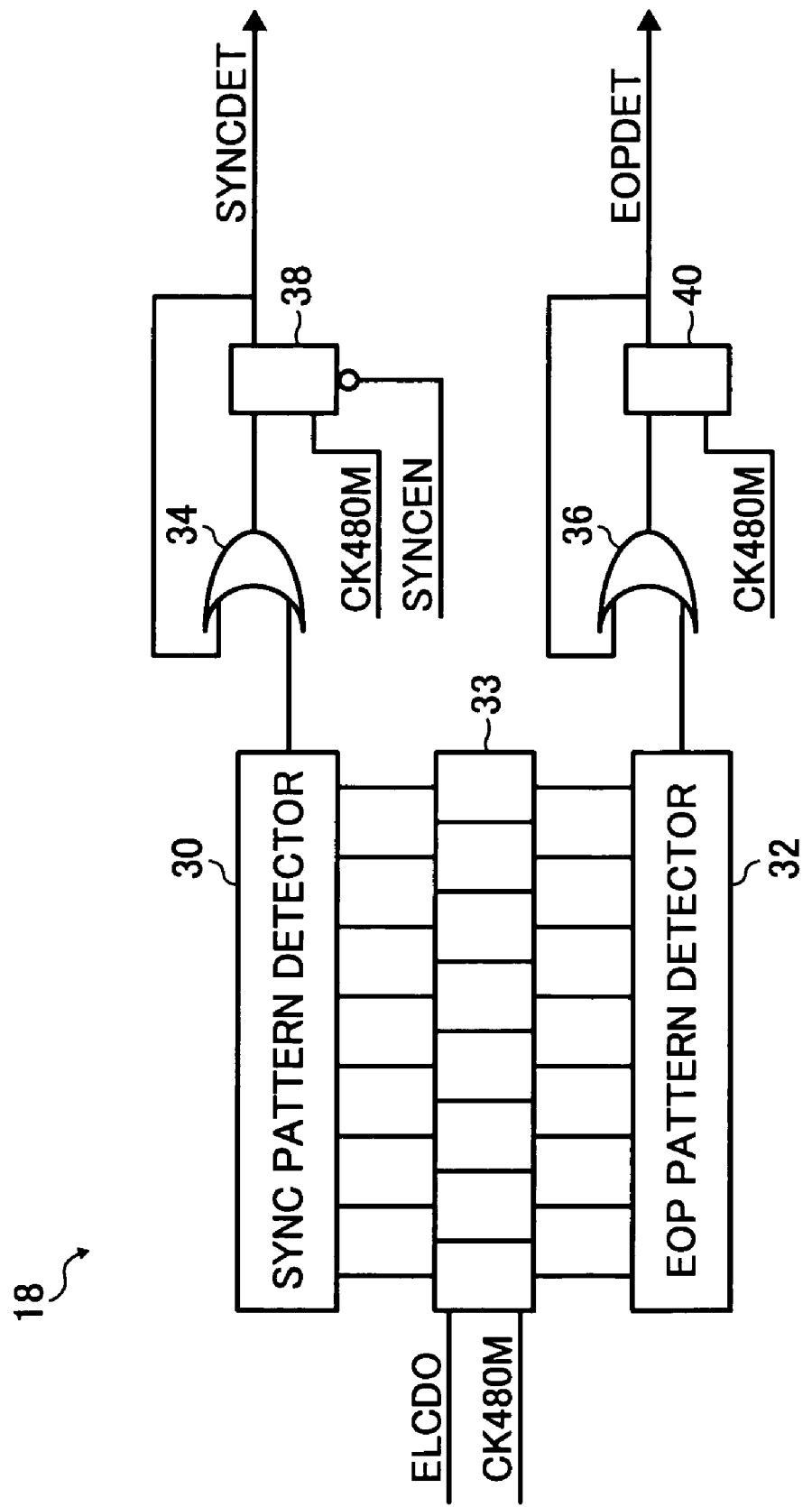
FIG. 6 is a circuit diagram illustrating an example of a pattern detector of the differential receiver circuit of FIG. 3.

Referring to FIG. 6, a circuit diagram illustrating an example of the pattern detector 18 is described.

Note that the pattern detector 18 of FIG. 6 is assumed to detect specific patterns assigned to serial data formatted according to Universal Serial Bus 2.0 specification, i.e., a SYNC pattern and an EOP pattern occurring in start and end portions of a USB packet. For example, the SYNC pattern is an 8-bit pattern represented as three repetitive K-J pairs followed by two K's, with "K" being a bit "0" and "J" being a bit "1" in binary data.

In FIG. 6, the pattern detector 18 includes a SYNC pattern detector 30, an EOP pattern detector 32, a shift register 33, OR gates 34 and 36, and flip-flops 38 and 40.

In the pattern detector 18, the shift register 33 receives the buffered data ELCDO and the system clock CK480M. The shift register 33 shifts each bit of the ELCDO signal during each CK480M cycle, and outputs multi-bit parallel data to each of the SYNC pattern detector 30 and the EOP pattern detector 32.

The SYNC pattern detector 30 outputs a high signal when input bits of the parallel data match the SYNC pattern. The flip-flop 38 receives the system clock CK480M and the enable signal SYNCEN. A high signal from the SYNC pattern detector 30 is input to the flip-flop 38 through the OR gate 34, so that the flip-flop 38 outputs the detection signal SYNCDET going high, when enabled by the SYNCEN signal.

The EOP pattern detector 32 outputs a high signal when input bits of the parallel data match the EOP pattern. The flip-flop 40 receives the system clock CK480M. A high signal from the EOP pattern detector 32 is input to the flip-flop 40 through the OR gate 36, so that the flip-flop 40 outputs the detection signal EOPDET going high.

Figure 7:
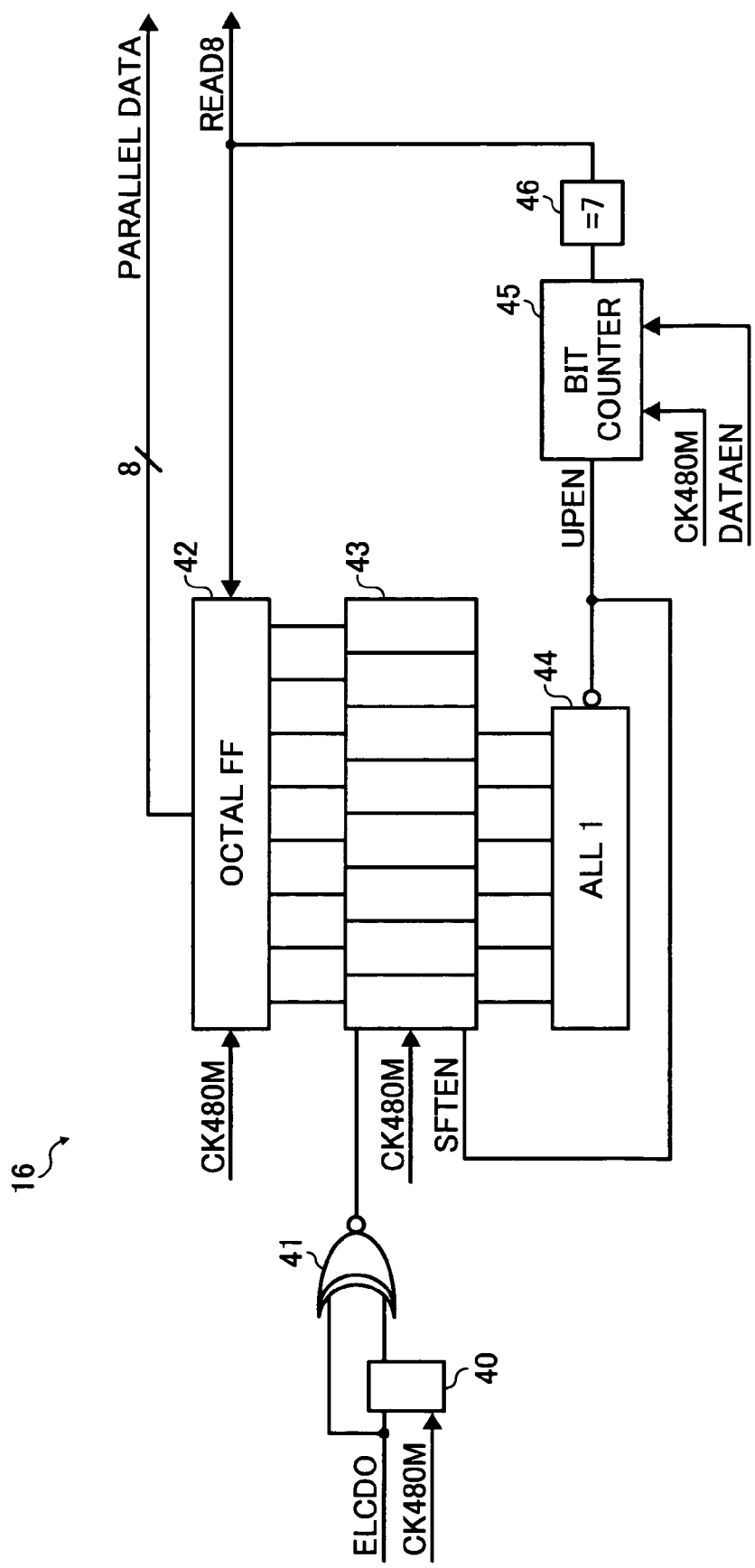
FIG. 7 is a circuit diagram illustrating an example of a demodulator/converter of the differential receiver circuit of FIG. 3.

Referring to FIG. 7, a circuit diagram illustrating an example of the demodulator/converter 16 is described.

Note that the demodulator/converter 16 of FIG. 7 is assumed to demodulate serial data generated according to a data transfer scheme defined by USB 2.0 specification as follows:
1. Original data is serialized so that a least significant bit (LSB) is transferred first and a most significant bit (MSB) last.
2. A data bit "0" is inserted after every consecutive six "1"s in serialized data.
3. Data is transformed using Non-Return-to-Zero Inverted (NRZI) encoding, where a data bit "0" is represented by a change in signal level and a data bit "1" is represented by no change in signal level.

In FIG. 7, the demodulator/converter 16 includes a flip-flop 40, an EXNOR gate 41, an octal flip-flop with clock enable 42, a shift register with shift enable 43, a pattern detector 44, a bit counter 45, and a decoder 46.

In the demodulator/converter 16, the flip-flop 40 receives the system clock 40 and the data signal ELCDO to output a one-bit delayed version of the ELCDO signal. The EXNOR gate 41 receives the ELCDO signal and the delayed version thereof to output decoded serial data to the shift register 43.

The shift register 43 receives the serial data, an enable signal SFTEN, and the system clock CK480M. When enabled by the SFTEN signal, the shift register 43 shifts each bit of the incoming serial data during each CK480M cycle to output multiple data bits.

The pattern detector 44 receives the multiple data bits from the shift register 43, and serves to detect six consecutive "1"s in the incoming data bits. Upon detection of six "1"s, the pattern detector 44 outputs the SFTEN signal and an enable signal UPEN going low to disable the shift register 43 and the bit counter 45, respectively.

The bit counter 45 receives the UPEN signal, the system clock CK480M, and the enable signal DATAEN. When enabled by the DATAEN signal and by the UPEN signal, the bit counter 45 increments during each CK480M cycle to output values to the decoder 46. The decoder 46 outputs a high signal when the bit counter 45 counts up to 7, i.e., 1 byte, providing the indication signal READ8 to the octal flip-flop 42 and to the controller 20, not shown.

The octal flip-flop 42 receives the multiple data bits from the shift register 43, the system clock CK480M, and the READ8 signal, and serves to latch the incoming data bits. When enabled by the READ8 signal, the octal flip-flop 42 outputs the latched data in 8-bit parallel data through parallel data lines synchronously with the system clock CK480M.

Figure 8:
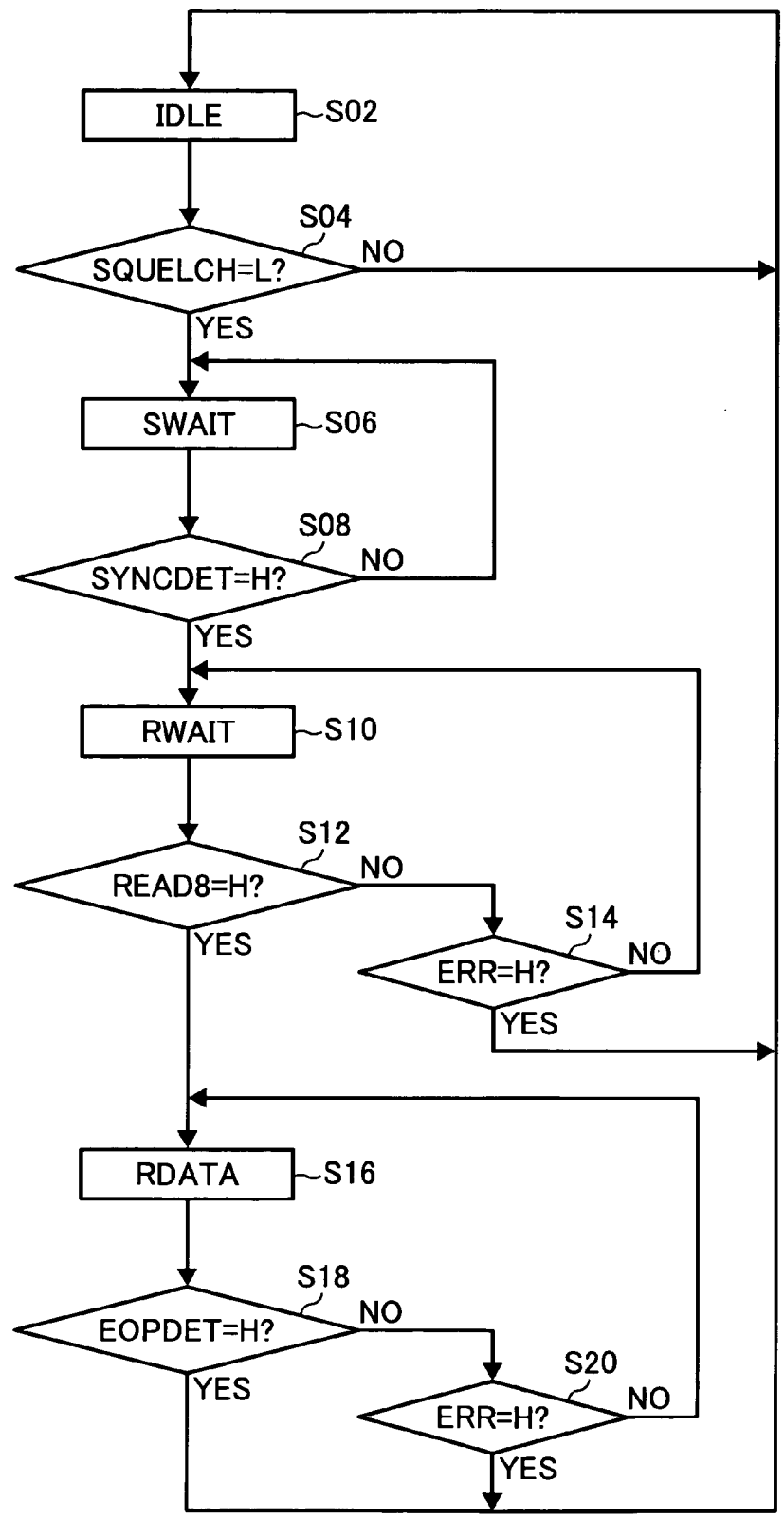
FIG. 8 is a flow chart illustrating operation of an embodiment of the differential receiver circuit of FIG. 3 is described.

Referring now to FIG. 8, a flow chart illustrating the operation of the differential receiver circuit 12 is described.

In step S02, the controller 20 is in an inactive state IDLE with the SQUELCH signal remaining high, where the enable signals ELCEN, SYNCEN, and DATAEN remain low. When the SQUELCH signal goes low in step S04, the controller 20 enters a wait state SWAIT in step S06, where the ELCEN and SYNCEN signals go high to enable the ELC buffer 14 and the pattern detector 18, respectively.

When the SYNCDET signal goes high indicating initiation of data transfer in step S08, the controller 20 enters a wait state RWAIT in step S10, where the DATAEN signal goes high to enable the demodulator/converter 16 with the ELCEN signal remaining high.

When the READ8 signal goes high in step S12, the controller 20 enters a transfer state RDATA in step S16, where the DATAEN and ELCEN signals remain high so that the demodulator/converter 16 can continue to receive serial data for processing.

When the EOPDET signal goes high indicating termination of data transfer in step S18, the controller 20 returns to the IDLE state with the SQUELCH signal going high, causing the ELCEN, SYNCEN, and DATAEN signals to go low.

Further, when the READ8 signal remains low in step S12 and the controller 20 detects the ERR signal going high in step S14, the controller 20 returns to the IDLE state, causing the ELCEN, SYNCEN, and DATAEN signals to go low. Similarly, when the EOPDET signal remains low in step S18 and the controller 20 detects the ERR signal going high in step S20, the controller 20 returns to the IDLE state, causing the ELCEN, SYNCEN, and DATAEN signals to go low.

Thus, the differential receiver circuit 12 initiates data transfer in response to the SQUELCH signal when the received differential signal contains a given start pattern. Further, the differential receiver circuit 12 continues the data transfer only when the differential signal contains a given amount of data. This enables secure and stable data transfer, providing protection against possible malfunction of the squelch detector 6 in high-speed differential signaling.

In a further embodiment of the differential receiver circuit 12, the controller 20 is connected to a signal masking circuit 50 having a timer.

In the differential receiver circuit 12, the signal masking circuit 50 deactivates the SQUELCH signal for a given time period T after termination of data transfer. The timer serves to count time and outputs an indication signal TIMOUT, which goes high when the given time period T expires after termination of data transfer.

Figure 9:
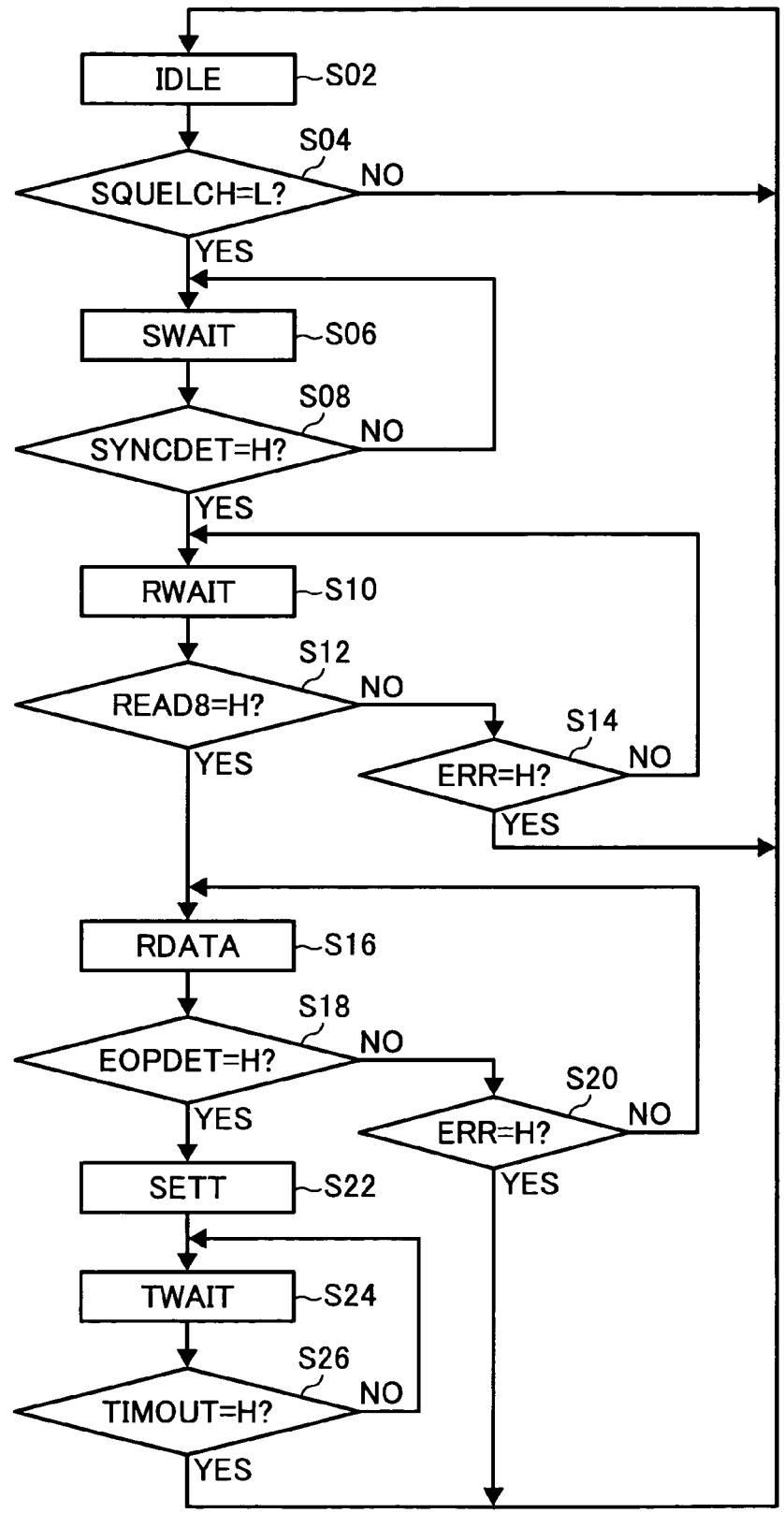
FIG. 9 is a flow chart illustrating operation of another embodiment of the differential receiver circuit of FIG. 3.

Referring to FIG. 9, a flow chart illustrating the operation of the differential receiver circuit 12 with the signal masking circuit 50 is described.

As shown in FIG. 9, the second embodiment follows the same steps as those described in FIG. 8 except for steps S22, S24, and S26 to be performed subsequent to termination of data transfer.

When the EOPDET signal goes high in step S18, the controller 20 terminates the data transfer, and sets the timer to start counting in step S22. The controller enters a wait state TWAIT in step S24, where the signal masking circuit 50 deactivates the SQUELCH signal for the given time period T.

When the TIMOUT signal goes high in step S26, the signal masking circuit 50 activates the SQUELCH signal and the controller 20 returns to the IDLE state.

In the present embodiment, the differential receiver circuit 12 is configured to avoid initiating data transfer immediately after a preceding operation, where the SQUELCH signal can become relatively unreliable as the data line pair transitions from active to idle. Such a configuration provides further protection against possible malfunction of the squelch detector 6, which can occur, for example, due to imperfect impedance matching between transmitter and receiver circuits.

Preferably, the time period T may be externally specified and set so that the SQUELCH signal remains deactivated until the differential receiver circuit 12 fully outputs the parallel data PARALLEL DATA corresponding to a received differential signal. This may be effective especially when the differential receiver circuit 12 is constructed on a semiconductor IC, where high speed serial data is converted to relatively low speed 8- or 16-bit parallel data clocked on a same system clock within a continuous substrate, making squelch detection less reliable.

In a still further embodiment of the differential receiver circuit 12, the pattern detector 18 includes an alternative SYNC pattern detector 30' in place of the SYNC pattern detector 30, which detects a given data pattern as well as a given start pattern appearing in the incoming ELCDO signal. The pattern detector 18 with the SYNC pattern detector 30' outputs the SYNCDET signal going high to indicate detection of the given start pattern and the given data pattern.

For example, such a data pattern to be detected may be a unique identifier pattern assigned to a formatted block of data, such as a Packet ID (PID) field of a USB packet used to identify the type of packet formatted according to USB 2.0 specification.

Referring to FIGS. 10A through 10D, examples of formats for different types of USB packets are illustrated.

USB 2.0 specification defines sixteen different packet formats categorized in four types, including Token packet (FIG. 10A), Start-of-Frame (SOF) packet (FIG. 10B), Data packet (FIG. 10C), and Handshake packet (FIG. 10D).

As shown in FIGS. 10A through 10D, each of these packet formats starts with a SYNC field followed by an 8-bit PID field. The PID field contains a PID and an inverted version of the same PID (labeled "PID" and "~PID" in the drawings) each being 4 bits long. The pattern detector 18 with the SYNC pattern detector 30' serves to detect the SYNC pattern and the PID field, determining whether the PID field is properly aligned.

In the present embodiment, the differential receiver circuit 12 is configured to more effectively ensure that the received data is formatted according to given serial interface standards. Such a configuration may be preferable when the serial interface is based on USB specification with the 8-bit SYNC pattern, which can be erroneously extracted when noise is present on the data line pair.

This invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

Numerous additional modifications and variations are possible in light of the above teachings. It is therefore to be understood that within the scope of the appended claims, the disclosure of this patent specification may be practiced otherwise than as specifically described herein.

What is claimed as new and desired to be protected by Letters Patent of the United States is:

1. A receiver for a differential signal transmitted over a serial interface, the receiver comprising:
   a squelch detector configured to output a squelch signal when determining that the differential signal is present on the serial interface;
   a differential amplifier configured to extract binary data from the differential signal;
   a start pattern detector configured to indicate a first state when detecting a given start pattern in the binary data;
   an end pattern detector configured to indicate a second state when detecting a given end pattern in the binary data; and
   a controller configured to activate the start pattern detector in response to the squelch signal, to validate the differential signal in the first state, and to end receiving the differential signal in the second state.

2. The receiver according to claim 1, wherein the controller prematurely ends receiving the differential signal in the first state when determining that the binary data does not conform to a given format.

3. The receiver according to claim 1, further comprising a counter configured to indicate an amount of the binary data, wherein the controller validates the differential signal in the first state only when the binary data is larger than a reference value.

4. The receiver according to claim 1, wherein the controller deactivates the squelch signal for a given time period after entering the second state.

5. The receiver according to claim 4, wherein the receiver is constructed on an integrated circuit, and the squelch signal remains deactivated until the binary data is output from the integrated circuit.

6. The receiver according to claim 1, wherein the serial interface is based on Universal Serial Bus 2.0 specification.

7. The receiver according to claim 6, wherein the given start pattern includes a SYNC field and a Packet ID field according to Universal Serial Bus 2.0 specification.

8. The receiver according to claim 1, wherein the given start pattern and the given end pattern are externally specified.

9. The receiver according to claim 3, wherein the reference value is externally specified.

10. A method for receiving and processing a differential signal transmitted over a serial interface, the method comprising performing, with a circuit, the steps of:
   outputting a squelch signal when determining that the differential signal is present on the serial interface;
   extracting binary data from the differential signal;
   detecting a given start pattern in the binary data in response to the squelch signal;
   validating the differential signal upon detection of the given start pattern;
   detecting a given end pattern in the binary data; and
   ending receiving the differential signal upon detection of a given end pattern.

11. The method according to claim 10, further comprising the step of prematurely ending receiving the differential signal when determining that the binary data does not conform to a given format.

12. The method according to claim 10, further comprising the step of indicating an amount of the binary data,
   wherein the differential signal is validated only when the binary data is larger than a reference value.

13. The method according to claim 10, further comprising the step of deactivating the squelch signal for a given time period after ending receiving the differential signal.

14. The method according to claim 10, further comprising the step of outputting the binary data from an integrated circuit,
   wherein the squelch signal remains deactivated until the binary data is output.

15. The method according to claim 10, wherein the serial interface is based on Universal Serial Bus 2.0 specification.

16. The method according to claim 15, wherein the given start pattern includes a SYNC field and a Packet ID field according to Universal Serial Bus 2.0 specification.

17. The method according to claim 10, wherein the given start pattern and the given end pattern are externally specified.

18. The method according to claim 12, wherein the reference value is externally specified.

* * * * *